(12) United States Patent
Dehart (10) Patent No.: US 7,096,562 B1
(45) Date of Patent: Aug. 29, 2006

(54) METHOD FOR MAKING A SAFETY SEAT HAVING A MOLDED SHELL AND A SAFETY RESTRAINT SYSTEM INTEGRAL THERETO

(75) Inventor: Gary Gene Dehart, Cornelius, NC (US)

(73) Assignee: Motorsports Builders, LLC, Charlotte, NC (US)

( * ) Notice: Subject to any disclaimer, the term of this patent is extended or adjusted under 35 U.S.C. 154(b) by 0 days.

(21) Appl. No.: 11/001,529

(22) Filed: Dec. 1, 2004

Related U.S. Application Data (62) Division of application No. 10/657,970, filed on Sep. 9, 2003.

(51) Int. Cl.
*B23P 17/00* (2006.01)
(52) U.S. Cl. .................. 29/527.1; 29/428; 29/433
(58) Field of Classification Search ............ 297/216.1, 297/216.16, 216.18, 468, 452.14; 296/68.1; D6/356; 29/527.1, 428, 433, 434, 91.1
See application file for complete search history.

(56) References Cited

U.S. PATENT DOCUMENTS

| | | | | |
|---|---|---|---|---|
| 3,389,935 A | | 6/1968 | Getz et al. ............. 297/452 |
| 3,695,696 A | | 10/1972 | Lohr et al. ............. 297/388 |
| D234,033 S | | 1/1975 | Tarbet ..................... D6/1 |
| D283,469 S | | 4/1986 | Zimmerman ........... D6/356 |
| D321,992 S | * | 12/1991 | Butler .................... D6/356 |
| 5,251,963 A | | 10/1993 | Inayoshi et al. ........ 297/460 |
| 5,363,939 A | | 11/1994 | Catlin .................... 180/291 |
| 5,513,897 A | * | 5/1996 | Lemmen ................. 297/410 |
| 5,947,515 A | * | 9/1999 | Fitch ..................... 280/748 |
| 6,056,366 A | | 5/2000 | Haynes et al. ......... 297/452.18 |
| 6,139,109 A | * | 10/2000 | Lajoie .................. 297/452.28 |
| 6,224,018 B1 | | 5/2001 | Hinestroza ............ 244/121 |
| 6,626,259 B1 | * | 9/2003 | Doehrer ................. 180/271 |
| 6,733,710 B1 | * | 5/2004 | Lewis .................... 264/222 |
| 6,779,841 B1 | * | 8/2004 | Eckendorff ........... 297/216.13 |
| D507,122 S | * | 7/2005 | Beermann ............. D6/356 |
| 6,935,672 B1 | * | 8/2005 | Dehart .................. 296/68.1 |
| 6,953,223 B1 | * | 10/2005 | Nelson et al. ......... 297/216.13 |
| 6,991,286 B1 | * | 1/2006 | Nelson et al. ......... 297/216.1 |
| 2002/0047297 A1 | | 4/2002 | Longhi et al. ......... 297/284.1 |
| 2002/0149253 A1 | * | 10/2002 | MacDonald .......... 297/452.14 |
| 2004/0178667 A1 | * | 9/2004 | Fujita et al. .......... 297/216.1 |
| 2004/0183344 A1 | * | 9/2004 | Glance et al. ......... 297/216.1 |
| 2005/0184577 A1 | * | 8/2005 | Nelson et al. ......... 297/468 |

* cited by examiner

*Primary Examiner*—Essama Omgba
(74) *Attorney, Agent, or Firm*—Kennedy Covington Lobdell & Hickman, LLP (57) ABSTRACT

A safety seat comprising a unitary molded shell having a "bucket-seat" shape and a safety restraint system integral to the shell. The molded unitary shell has a bottom portion and a back portion. The shell comprises an inner layer and an outer layer made of a carbon fiber laminate with a core situated between the inner and outer layers. The core comprises aluminum sheeting having a honeycomb-like cross-section. A plurality of attachment plates are selectively located within the shell and disposed between the inner and outer layers. The safety restraint system is fastened to corresponding attachment plates. Support plates located on a non-seating surface of the shell are mated with selected attachment plates. A headrest is selectively attached to the safety seat. The safety seat is secured to structural members within a vehicle by mounting brackets. A method for making the shell and assembling the safety seat are disclosed.

13 Claims, 5 Drawing Sheets

METHOD FOR MAKING A SAFETY SEAT HAVING A MOLDED SHELL AND A SAFETY RESTRAINT SYSTEM INTEGRAL THERETO

BACKGROUND OF INVENTION

The present invention relates to occupant safety devices within vehicles, and more particularly molded safety seats used in race cars, and methods of making and using said safety seats.

Vehicles provide convenient and usually safe transportation. Since almost the introduction of the automobile, people have been racing them, the goal being faster than one's competitors. The automobiles used for racing range from specially built futuristic designs to cars and trucks that have at least a passing resemblance to those driven on ordinary streets.

One concept that is similar in both racing and ordinary automobiles is the safety of occupants during collisions. Although the types of collisions experienced on ordinary streets and race tracks are similar, i.e., car-to-car collisions, car-to-barrier collisions, flips and combinations thereof, the forces exerted upon automobiles involved in collisions on the race track are typically many times greater. While ordinary automobiles have various overlapping safety devices—seat and shoulder belts and front and side airbags to name the obvious ones—these devices add weight to automobiles and may not necessarily be practical for use in racing automobiles. Accordingly, the designer, builder, and driver of racing automobiles must satisfy the competing requirements of providing safety devices for the driver while minimizing weight. Additional constraints may include requirements placed upon the racing automobiles by sanctioning bodies, ease of manufacture, interaction of the safety devices with other automobile components, driver comfort, and costs.

One such racing organization, racing under the umbrella organization called the National Association of Stock Car Automobile Racing (NASCAR), involves the racing of automobiles (cars and pick ups or trucks) that resemble those manufactured and sold to the public by large automobile companies such a Chevrolet, Ford, Dodge and Pontiac. These automobiles weigh in excess of 3,000 pounds and can reach speeds in excess of 200 mph. In collisions, drivers of such automobiles are subjected to severe and multi-directional forces. The use of conventional safety systems activated by a collision, such as the air bags found in newer model automobiles, are impractical and could increase the risks of injury to a driver of a racing automobile. Thus, one of the primary safety devices (another being the roll-cage enclosure which surrounds the driver's compartment) for such racing automobiles is the safety seat. The safety seat must not only offer protection to the driver, but it must also provide some measure of comfort to a driver. The seat must be strong enough to withstand certain forces without losing its structural integrity. A safety restraint system works in tandem with the seat to prevent the driver from being ejected from the seat during any collision. Typically, the safety restraint system employs a 5-point harness—two shoulder straps, a left and right lap belts and a crotch strap—or a 6-point harness—two shoulder straps, two lap belts and two straps circling a driver's thighs—all meeting at and releasably connected to the buckle manipulated by the driver. The opposing end of the straps and belts are secured to the roll cage or structural members of the vehicle such as door posts and floors.

The conventional safety seat used in NASCAR vehicles has a shell of shaped and welded aluminum covered in padding. Typically, the aluminum shell is comprised of a seat bottom that is welded to a seat back. Cut-outs in the aluminum shell allow safety restraint straps to pass through the seat for adjustment and connection to the buckle. The aluminum seat is secured to the roll cage and other vehicle structural members such as the frame.

The conventional seat, though having been used for many years, has several disadvantages. During welding, the aluminum may be damaged or the strength reduced because of the heat applied. Further, flaws in the weld may go undetected. In these instances, the structural integrity of the aluminum shell is weakened and may fail if subjected to the forces of a collision. Additionally, care must be taken to ensure that the paths of the safety restraint straps from their securement points on the roll cage or vehicle frame to the buckle are free of areas that may "catch" the straps or damage the straps during use. One point of particular interest is the opening in the aluminum seat, which could abrade the straps during use or even cut the straps during a collision, depending on the forces exerted on the driver and, correspondingly, on the straps. Further, the adjustment of the straps relative to the driver is limited because of their route through the openings in the seat. This deficiency has been exacerbated with the advent of head-and-neck restraints mandated by NASCAR sanctioning body. These devices are positioned around the neck of a driver, increasing the thickness of the neck region. This increased thickness restricts where the shoulder straps can be placed on the driver's shoulder area, which may cause the straps to bunch and not lay flat upon the driver's shoulder, decreasing comfort and potentially increasing the risk of the straps not being adjusted correctly. Another disadvantage of the conventional seat is the lack of adjustability, especially with respect to the height at which the seat supports the head of the driver. Further, although a lighter metal, the shell must be a certain thickness of aluminum to provide the necessary strength, which increases the weight of the seat. Finally, the manufacture and installation of a seat requires multiple steps from the welding of the shell to the installation of the seat in the vehicle including multiple attachment locations within the vehicle and finally to the installation of the safety restraint straps to the roll cage and other vehicle structural members and threading them through the openings in the seat after the seat has been installed in the vehicle. Each step of the manufacturing and installation process provides the opportunity to damage to the seat and straps as well as incorrectly attach and tighten the seat and straps to the roll cage and car structure. These opportunities for mistakes increases the risk of injury to the driver.

It is desired to create a seat that eliminates or at least reduces the above disadvantages while maintaining a safe and secure environment for the driver without unnecessarily increasing the overall weight of the car or the costs involved.

SUMMARY OF THE INVENTION

The safety seat of the present invention comprises a unitary molded shell, having a bottom portion and back portion, and a plurality of safety restraint straps integral to the shell. An adjustable headrest may be attached to the back portion of the shell. The seat is attached to structural members of the car, for example the roll cage and/or a floor frame, by a plurality of mounting brackets. Flexible, resilient padding is added to the shell and the headrest (if attached) to cushion the driver from normal and abnormal forces that may be experienced while driving the automobile. The shell is preferably made of a carbon fiber/aluminum sheet laminate that is molded into the proper shape.

The safety seat of the present invention has several advantages over the conventional aluminum seat. The shell bottom and back portions are molded as a single unit, eliminating the inherent weakness of the welded joint in a conventional seat, thus increasing the overall strength of the shell and seat. This increase in strength may be of particular importance when the automobile, and hence the seat, is subjected to almost simultaneous multiple collisions from multiple directions which results in the seat encountering torsional as well as lateral forces. Because the safety restraint straps are integral to the shell, the straps and the seat move as a unit, reducing the potential for the straps to be pinched, abraded, or otherwise damaged during normal use and especially during collisions. A plurality of attachment plates, made of a structural material, disposed within the shell ensure a secure connection between the safety restraint straps and the shell as well as allowing the straps to be adjusted relative to the driver, thus increasing comfort and ensuring that the straps are properly positioned about the driver to provide maximum restraint of the driver. Likewise, the separate headrest is adjustable, allowing the headrest to properly contact the helmet of the driver, thus offering maximum protection from severe neck strains due to a whiplash effect. Linking members may be extended between and attached to the headrest and the seat to provide additional support to the seat/headrest combination. The shell may be molded in different dimensions, allowing a "custom-fit" for each driver. Alternatively, the shell may be molded in a generic size, with removable padding being used to "custom-fit" the resulting seat to the driver. Secondary support members, for example rib guards or leg rests, may be either made as a part of the shell, or made separately and attached to the shell. These secondary support members may be used to increase the comfort of the driver (e.g., leg rests) or provide extra support to an injured area (e.g., a padded rib guard to support injured ribs).

A method for making the seat of the present invention is also disclosed. The method results in a inherent structural integrity that offer advantages over the current art, namely welded aluminum seating pans. The shell is a laminate comprising of an inner layer and an outer layer of woven carbon fibers and resilient fibers with a core of aluminum sheeting having an hexagonal, honeycomb-like cross-section. In a preferred embodiment, the resilient fibers are KEVLAR® fiber material. The method includes using a mold to assemble the components of the shell and an autoclave to bond the assembled components together. Use of a mold not only provides a properly designed surface upon which to assemble the components, but also ensures uniformity and consistency regarding the dimensions and strength of the resulting shell. Molds of a single size may be used to create "generic" shells or differently sized molds may be used to create "custom" shells. Attachment plates—made of a structural material, preferably aluminum—are disposed between the inner layer and the outer layer at predetermined locations during assembly. These attachment plates, each having a plurality of pre-drilled holes therein, provide the foundation to which the straps of the safety restraint system are fastened. Certain attachment plates may also provide the foundation to which secondary support members (e.g., chest protector or rib guard) may be fastened. Fasteners may include, for example, bolts, screws, rivets and pins. Support plates, located on an exterior of the shell, may be fastened to corresponding attachment plates. The support plates may be used for attaching mounting brackets to the seat, as well as mounting other support members to the seat. For example, the headrest may be attached to the seat by fastening a connector plate extending from the headrest to a support plate on the seat.

After the shell is completed, the straps of the safety restraint system may be attached to the shell. Each strap has an attachment end and a buckle end. The attachment end of each strap is secured to the shell using an appropriate mounting system. Each strap is secured to a particular location on the shell. For example, the shoulder straps are secured to the back portion of the shell toward a top end of the shell, thus allowing the straps to properly drape over a driver's shoulders; the lap belts are attached at a lower location of the back portion of the shell or along the bottom portion of the shell so that the belts travel correctly across the pelvic region of the driver; and the crotch strap (5-point harness) or the leg straps (6-point harness) are attached to the bottom portion of the shell. If any of the straps are not used, then they may simply be detached from the shell. Likewise, if any of the straps is damaged, then that strap may be replaced by an undamaged one. The attachment locations for the straps may be adjusted during assembly of the seat to accommodate the driver's physical requirements and driving style. Further, the straps may be attached in such orientations as to accommodate braces or other devices worn by the driver. For example, the shoulder straps may be attached at a slight angle to allow the straps to drape over the driver's shoulders without interfering with, or being interfered by, a head-and-neck device which encloses the driver's neck.

The padding may be disposed on the shell before or after the straps are attached. Openings formed in the padding allows the straps to extend through the padding to secure the driver in the seat. The padding may be custom made, i.e., contoured to accommodate a particular driver, or formed from foam blocks cut to fit the shell. The padding may be adhered to the shell to prevent undesired displacement of the padding during use. Likewise, the exposed portion of the padding may be covered, e.g. by cloth or other covering, to prevent damage or excessive wear.

An advantage of the present invention is that the entire seat may be assembled—the straps secured to the shell and adjusted, the headrest adjusted and secured and the padding added—while the seat is outside of the vehicle. Such complete access is not available with the conventional aluminum safety seat. In a conventional seat, the aluminum shell (with or without the padding) must first be installed in and attached to the vehicle. The straps must be secured to certain locations on the roll cage or a structural member of the vehicle and then threaded through openings in the aluminum shell, working around the seat in confined areas and awkward positions. Typically on racing vehicles, occupant doors do not exist or are welded shut to prevent failure of the door latch and subsequent ejection of the driver during collisions and to allow the roll cage to extend across the door area, strengthening the driver compartment. Thus, installation of elements within the driver compartment, i.e., within the roll cage, requires the installer to either stand outside of the vehicle and lean into the open window area to perform the work or to kneel or sit in a cramped position within the roll cage. Such positions hinder accessibility and visibility of the shell and straps which may cause an installer to incorrectly secure or improperly adjust certain elements, such as the safety restraint straps or the shell itself. The safety seat of the present invention allows the installer to easily access all components of the seat during assembly, which allows the installer to directly view the area of installation without fatigue. Once the seat of the present invention is completed outside of the vehicle, the seat may be inserted through the window opening in the vehicle and secured by brackets to structural members of the vehicle. In a preferred embodiment, the seat is secured to the roll cage and a vehicle floor frame. Installation of the seat as a unit also reduces the time required for such work, freeing the personnel for additional duties.

Another possible advantage of the present invention is that, in certain instances, an injured driver may choose to start a race with the stated intention to relinquish driving duties at some point in the race. In these cases, a substitute driver is selected ahead of the race. With conventional aluminum seats, the injured driver and the substitute driver must share the seat; the seat cannot be adjusted to accommodate a difference in height or driving position because of the time required to remove the straps from the openings in the first seat shell, detach the first seat from its multiple attachment points in the vehicle, remove the first seat, insert the second seat, attach the second seat to the vehicle, and rethread the straps through the openings in the second seat (with or without having to reattach the straps to different locations on the roll cage or the vehicle), all before the second driver is able to enter the vehicle and adjust the straps before connecting them to the buckle. The time required to accomplish these tasks is prohibitive during a race. Thus, either the injured driver or the substitute driver must drive the vehicle in a seat that is not properly sized or adjusted for the driver, forcing the driver to drive in an uncomfortable, and possibly unsafe, condition. Because the seat of the present invention may be assembled in advance, the seat may the properly sized and the safety restraint straps properly adjusted for the substitute driver. In certain situations, the time required to detach the injured driver's seat from the vehicle and install the substitute driver's seat may be short enough to allow a switch of seats, thus providing both drivers with the optimum protection and comfort.

While the primary use of the safety seat of the present invention is in racing automobiles such as cars and trucks, one of ordinary skill can readily appreciate that the safety seat may be used in any vehicle having a compartment for the driver and/or passengers. For example, it is envisioned that the safety seat of the present invention may be used in watercraft and aircraft as well in typical passenger automobiles.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENT

Figure 1:
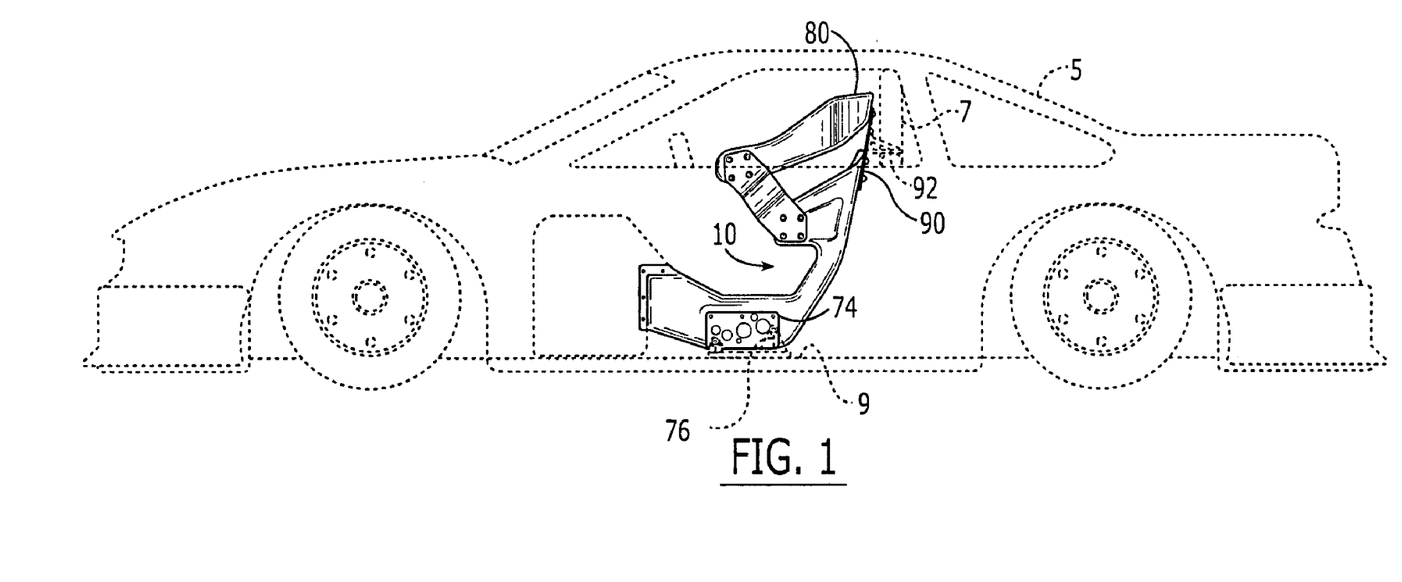
FIG. 1 illustrates the safety seat of the present invention as it would be positioned within a driver compartment of an automobile.

Referring to FIG. 1, a safety seat 10 is positioned within a vehicle 5 and attached to certain structural members of the vehicle 5, e.g., a roll cage 7 and floor frame 9, by mounting brackets 76, 92 fastened to support plates 74, 90 that are attached to the safety seat 10. In a preferred embodiment, headrest 80 is attached to the safety seat 10.

Figure 2:
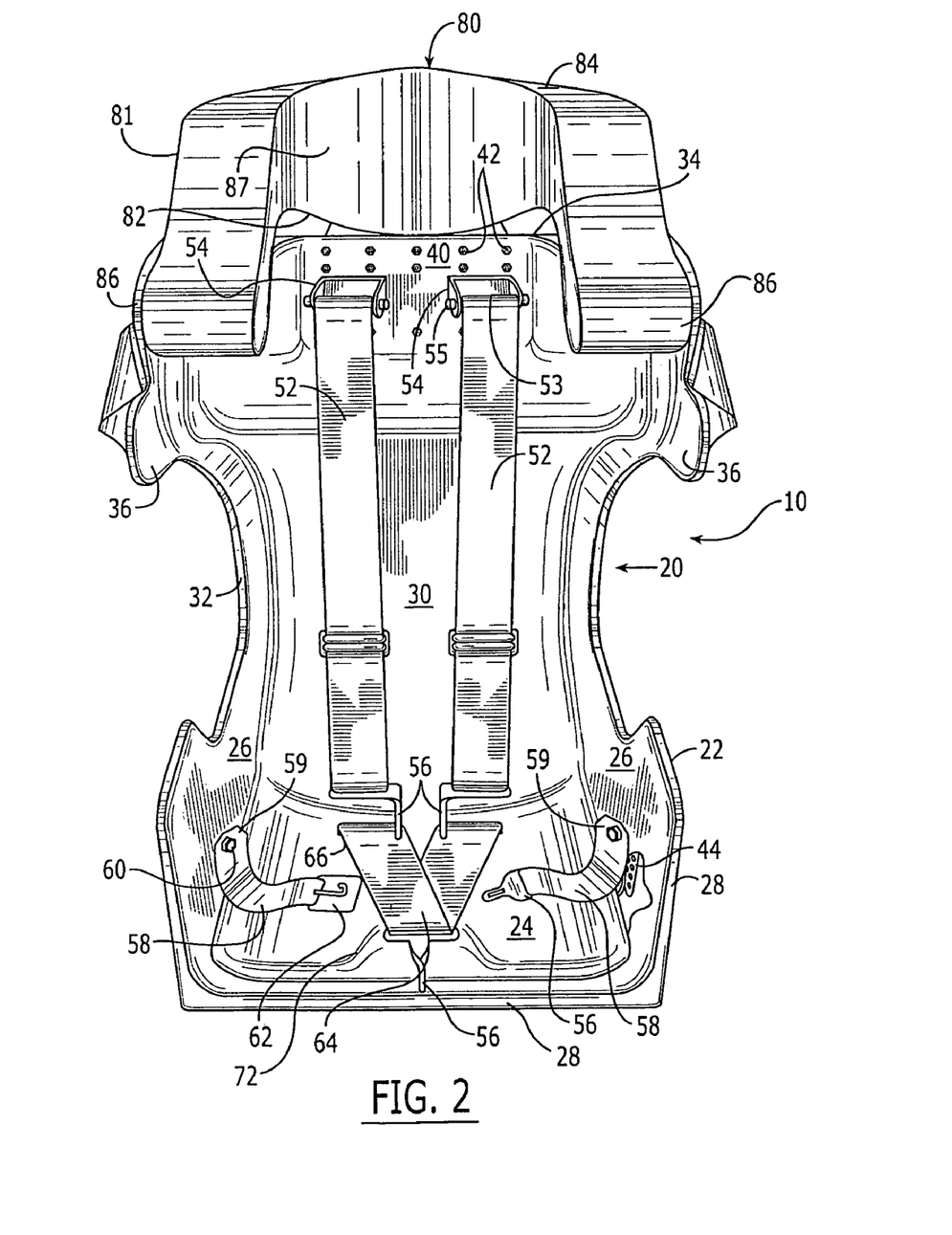
FIG. 2 is a front view of a shell and safety restraint system components of the present invention.
Figure 3:
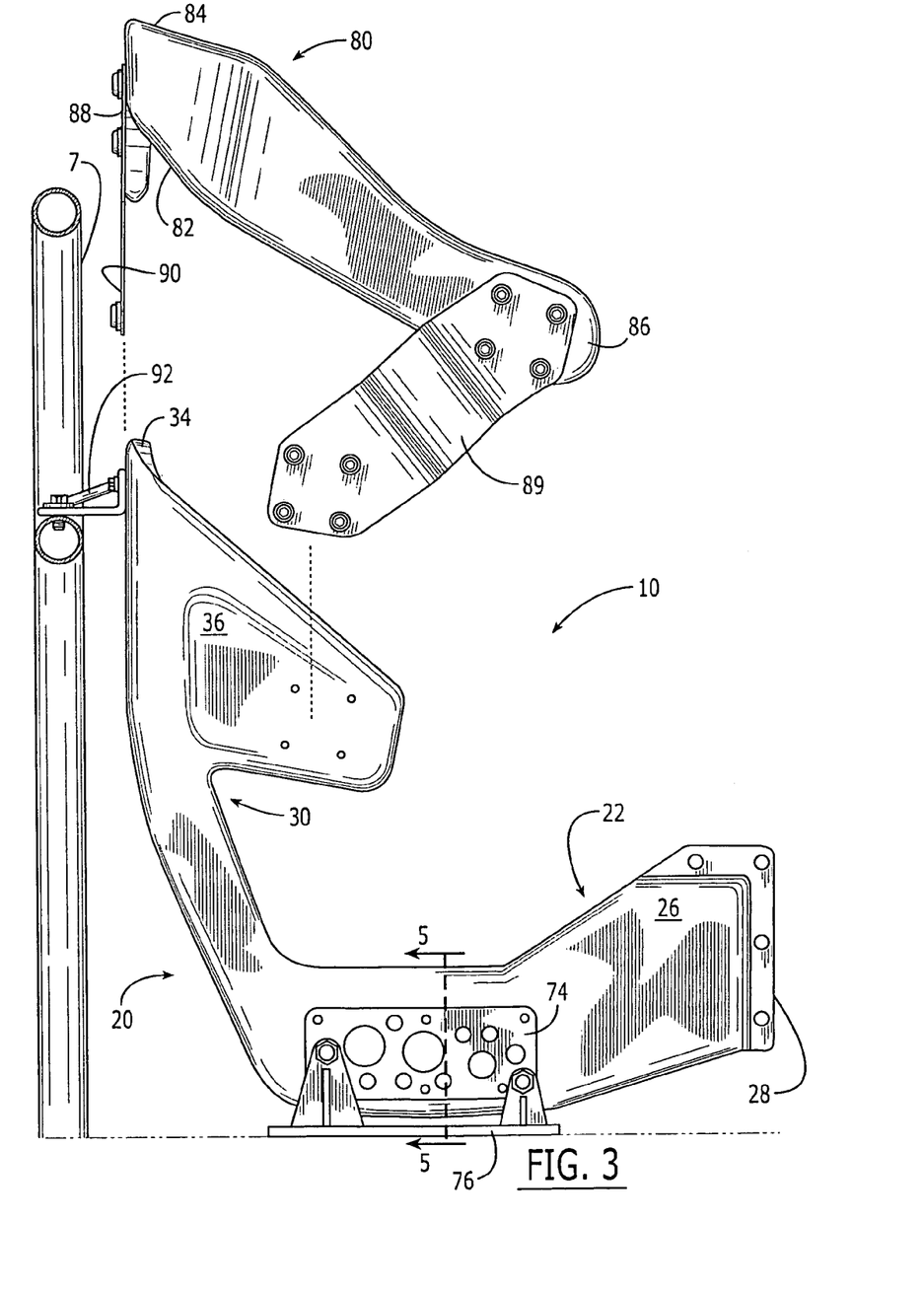
FIG. 3 is a side view of the molded safety seat of the present invention, illustrating one mode of securing the safety seat to a vehicle.
Figure 5:
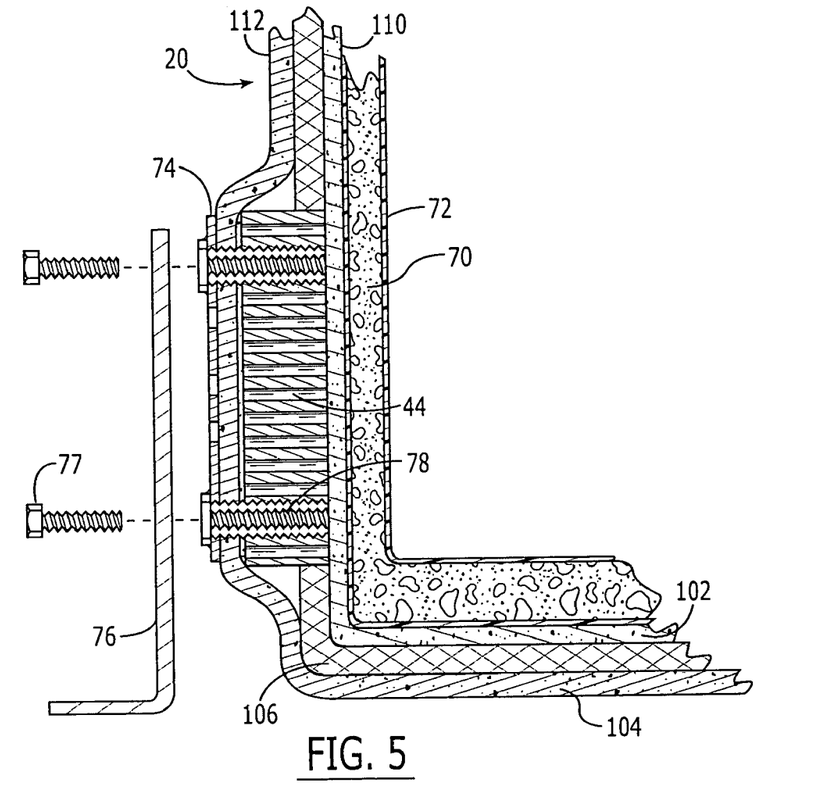
FIG. 5 is a cross-sectional view of the safety seat and mounting bracket as taken along line 5—5 in FIG. 3.

As shown in FIG. 2, the safety seat 10 includes a unitary molded shell 20, a safety restraint system integral to the shell 20 and padding 70 disposed on a seating surface 110 of the shell 20 (as illustrated in FIG. 5). The shell 20 has a bottom portion 22 that seamlessly merges into a back portion 30 such that the shell 20 has a "bucket-seat" type shape. The bottom portion 22 is U-shaped with a base 24 and opposing sides 26 extending generally perpendicularly from the base 24, the base being generally horizontal. The base 24 and sides 26 have a front edge 28 opposite the back portion 30 of the shell 20. The back portion 30 extends upwardly from the bottom portion 22 to a top end 34. The back portion 30 is concave with opposing sides 32 oriented toward the front edge 28 of the base 24 and sides 26 of the bottom portion 22. As illustrated in FIG. 3, a section of the back portion 30 near the top end 34 extends beyond the sides 32 to form wings 36. The wings 36 are located on the back portion 30 to engage shoulders of a driver (not shown) sitting in the safety seat 10 to prevent excessive lateral motion of the driver.

A plurality of attachment plates are disposed within the bottom portion 22 and the back portion 30 of the shell 20. As illustrated in FIG. 5, the attachment plates (side plate 44) provide a foundation for attaching various components of the safety seat. The following attachment plates are typical of the plurality of the attachment plates that may be disposed in the shell 20. For example, back plate 40 is disposed on the back portion 30 near the top end 34. A plurality of attachment holes 42 on the back plate 40 are transferred to the shell. As shown in FIG. 5, a side plate 44 is disposed on each of the sides 26 of the bottom portion 22 intermediate the front edge 28 and the back portion 30. A bottom plate (not shown) is disposed on the base 24 of the bottom portion. In a preferred embodiment, attachment plates are located on the sides 32 of the back portion 30 intermediate the bottom portion 22 and the wings 36. Additional attachment plates may be disposed within the shell 20 and the headrest 80, for example in the wings 36.

The safety restraint system, is secured to the shell 20. In a preferred embodiment, as shown in FIG. 2, the safety restraint system comprises a 5-point harness having shoulder straps 52, lap belts 58 and crotch strap 64. In another preferred embodiment, the safety restraint system comprises a 6-point harness having shoulder straps, lap belts and two thigh straps. One of ordinary skill should readily understand that any configuration of safety restraint straps may be used.

Referring now to FIG. 2, the shoulder straps 52 each has an attachment end 53 and a buckle end 56. Mounting stirrups 54 are fastened to back plate 40. The attachment ends 55 of the shoulder straps 52 are connected to the mounting stirrups 54 by connecting fasteners 55. The connecting fasteners 55 and the mounting stirrups 54 allow the shoulder straps 52 to move longitudinally, but restricts any lateral motion thereof. The longitudinal motion of the shoulder straps 52 allows the shoulder straps to drape over the driver's shoulders and travel across the driver's trunk, thus securing the driver's upper body to the safety seat 10. The mounting stirrups 54 may be relocated upon the back plate 40 to accommodate the driver's physical requirements. In a preferred embodiment, the mounting stirrups are angled to splay the shoulder straps 52 toward the sides 32 of the back portion 30 so that the shoulder straps 52 avoid interference with a head-and-neck device worn by the driver.

The lap belts 58 are fastened to the side plates 44 disposed within the sides 26 of the bottom portion 22 of the shell 20. In a preferred embodiment, mounting stirrups similar to the shoulder mounting stirrups 54 may be used. In another preferred embodiment, the lap belts 58 are directly attached to the side plates 44. As shown in FIG. 2, the lap belts 58 each has an attachment end 59. Fasteners 60 inserted through the attachment end are secured to the side plates 44 such that the lap belts 58 rotate about the fasteners 60. One of the lap belts 58 has a buckle end 56. The other of the lap belts 58 has a locking device 62 attached at an end opposite the attachment end 59. The locking device is used to lock all of the buckle ends 56 of the straps together in a releasably secure manner. The operation of any of the safety restraint systems disclosed herein is beyond the scope of the present invention.

The crotch strap 64 is attached to a bottom plate (not shown) in a manner similar to the attachment of the shoulder straps 52 and the lap belts 58. The crotch strap has at least one attachment end 66 and a buckle end 56.

The shoulder straps 52, the lap belts 58 and the crotch strap 64 may also have adjustable lengths to accommodate drivers of different sizes.

As shown in FIG. 5, the shell 20 has a seating surface 110 and a non-seating surface 112. The safety restraint system is secured to the seating surface 110 of the shell 20 to eliminate any abrupt changes in direction of the straps and to eliminate any areas of abrading interaction between the shell 20 and the straps, thus removing many of the opportunities for damaging the straps of the safety restraint system that are prevalent in the current art.

Figure 4:
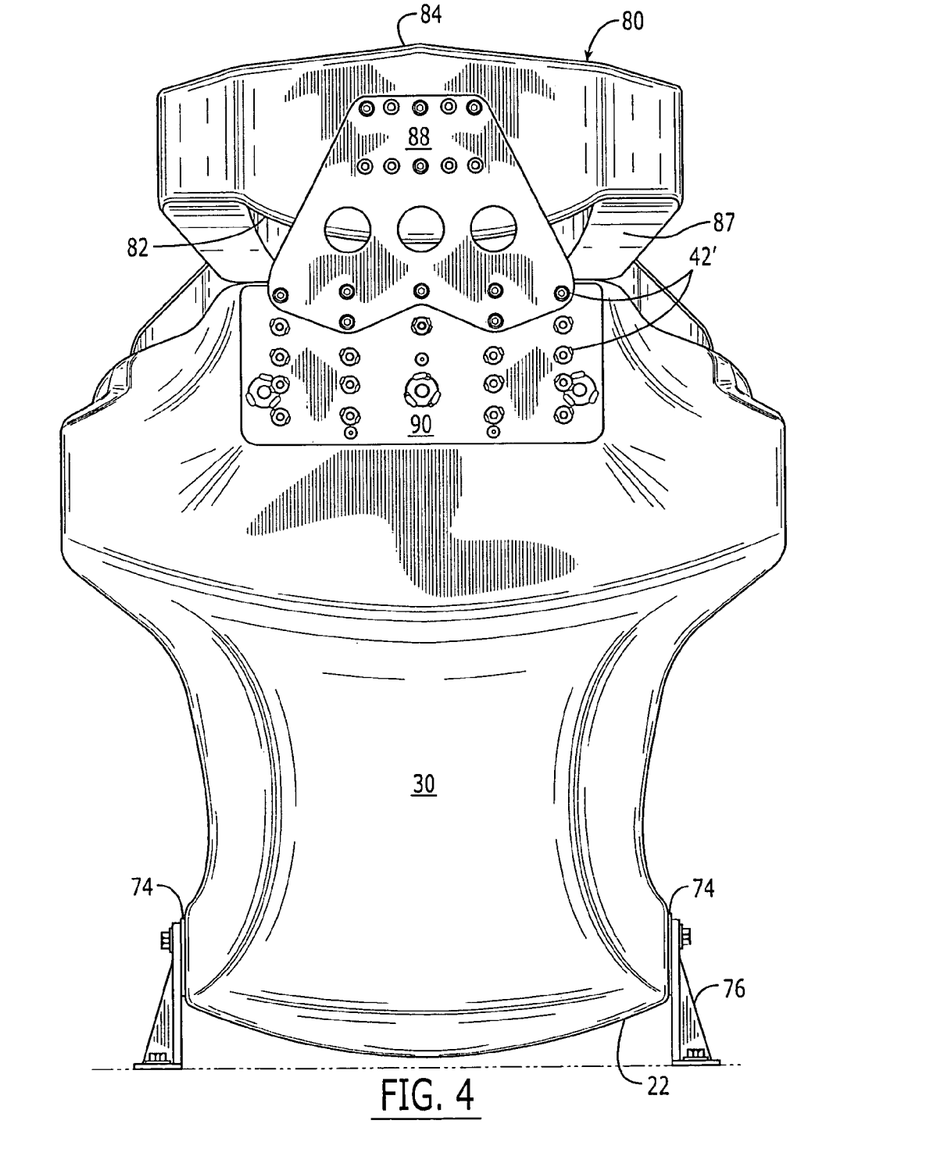
FIG. 4 is a back view of the safety seat of the present invention illustrating the attachment of the headrest to the back of the safety seat.

The safety seat 10 is secured within a vehicle by at least one mounting location. In a preferred embodiment, shown in FIGS. 3 and 4, support plates 74, 90 are disposed on the non-seating surface 112 of the shell 20. Each of the sides 26 of the bottom portion 22 of the shell 20 has a corresponding side support plate 74 disposed thereon; as shown in FIG. 5, the side support plates 74 are fastened to the corresponding side plate 44 disposed within the sides 26 of the bottom portion 22 of the shell 20. Back support plate 90 is fastened to the back plate 40 disposed within the back portion 30 of the shell 20. Preferably, the support plates 74, 90 are attached to the corresponding attachment plates 44, 40 by rivets, screws, or bolts. The support plates 74, 90 are made of a structural material, preferably steel or aluminum. Each side mounting bracket 76 has a seat end and a vehicle end. As shown in FIGS. 3 and 4, the seat end of each of the side mounting brackets 76 is fixedly attached to the corresponding side support plate 74. The vehicle end of the each of the side mounting brackets is fixedly attached to a portion of the roll cage 7 or a structural member of the vehicle 5, for example floor frames. Similarly, the back mounting bracket 92 has a seat end fixedly attached to the back support plate 90 and a vehicle end fixedly attached to a portion of the roll cage 7. It will be readily understood by one of ordinary skill that the safety seat 10 may be attached to any structural member of the vehicle 5 and there may by multiple attachment locations on the safety seat 10 and the vehicle 5 beyond those discussed above.

In a preferred embodiment headrest 80 is attached to the safety seat 10. The headrest 80 preferably comprises a molded shell 81 covered with padding 87. The headrest 80 may be of any desired shape. As shown in FIGS. 2–4, the headrest 80 has a curved top end 84 and a curved bottom end 82. Preferably, the headrest 80 has a concave shape similar to the back portion 30 of the shell. The bottom end 82 of the headrest 80 rests against the top end 34 of the back portion 30 of the shell 20. Sides of the headrest 80 continue the curvature of the headrest 80 to form extending members 86 facing toward the front edge 28 of the bottom portion 22 of the shell 20. As illustrated in FIG. 3, the extending members 86 project beyond the wings 36 of the upper portion 30 of the shell 20 and end at an point intermediate the front edge 28 of the bottom portion 22 of the shell 20 and the wings 36. Linking members 89 may extend between corresponding ends of the extending members 86 and the wings 36 to provide additional structural stability to the extending members 86 and the wings 36 as well as securely attach the headrest 80 to the safety seat 10. The headrest 80 is attached to the back support plate 90 by a connecting plate 88 extending therebetween. The connecting plate 88 is fixedly attached to a back of the headrest 88 and projects beyond the bottom end 82 to intersect with the back support plate 90, as shown in FIG. 4. The connecting plate 88 is attached to the back support plate 90 by fasteners inserted through holes in the connecting plate 88, and holes 42' in the back support plate 90 to engage the attachment holes 42 in the back attachment plate 40. By selectively matching the holes in the connecting plate 88 to holes 42' in the back support plate 90, the height of the headrest 80 may be adjusted relative to the safety seat 10. In a preferred embodiment, the padding 87 of the headrest comprises strips of foam attached to the shell 81 of the headrest 80 by tape.

The safety seat 10 exhibits an increase in structural integrity relative to the current art that is primarily due to the shell 20. As illustrated in FIG. 5, the shell 20 is a composite having an inner layer 102, and outer layer 104 and a core 106 situated between the inner and outer layers 102, 104. The plurality of attachment plates (shown in FIG. 5 as side plate 44) are disposed between the inner layer 102 and the outer layer 104. Holes 78 formed in the attachment plates create receptacles for fasteners 77 attaching support plates (as shown in FIG. 5 as side support plate 74), mounting brackets (shown as side mounting bracket 76) and straps of the safety restraint system thereto. The fasteners 77 may be any appropriate fastener, for example bolts, screws, rivets, dowels and pins. Padding 70 is located on the seating surface of the shell 20.

The inner layer 102 and the outer layer 104 are comprised of a plurality of sheets of woven carbon fiber and at least one sheet of resilient fiber material, preferably KEVLAR® fiber material, bonded together under a defined pressure and temperature. Preferably, the bonding occurs within an autoclave. The at least one sheet of KEVLAR® fiber material prevents the resultant matrix from shattering if subjected to an impact. Similar results may be found substituting fiberglass or a similar fibrous material within the matrix. Preferably, the sheets of woven carbon fiber are pre-pregnated with a bonding agent. The inner and outer layers 102, 104 have a thickness correlating to the number of sheets bonded together. In a preferred embodiment, the inner and outer layers 102, 104 each has a thickness of between about 90–100 thousandths of an inch, which corresponds to approximately eight sheets of woven carbon fiber and one sheet of KEVLAR® fiber material. The thickness of the inner layer 102 may also be greater or lesser than the thickness of the outer layer 104. One of ordinary skill can readily ascertain the optimal thickness of each of the inner layer 102 and the outer layer 104 to form a shell 20 for a particular purpose.

The core comprises a lightweight, flexible structural material. In a preferred embodiment, the core is made of an aluminum sheet having a hexagonal, honeycomb-like cross-section. The sheet is cut to conform to the outer layer.

The attachment plates are made of a lightweight structural material, preferably aluminum. The attachment plates may have any thickness to ensure a secure fixation of the fasteners therein. In a preferred embodiment, the attachment plates are approximately 0.5 inch thick. Holes (shown in FIG. 5 as 78) are pre-formed in the attachment plates. These holes may later by tapped and threaded to accept threaded fasteners, or sleeves may be inserted into the holes to alter the size and relation of the selected holes.

The support plates are located on the non-seating surface 112 of the shell 20 and are attached to corresponding attachment plates, thus situating the outer layer 104 between the support plate and the attachment plate. The support plate is made of a structural material, preferably steel or aluminum. Preferably rivets or screws fasten the support plate to the attachment plate.

The padding 70 may be custom-made to specifications of a particular driver or formed from shaped foam blocks and strips. The padding 70 is preferably removably attached to the seating surface 110 of the shell 20 to prevent undesired displacement of the padding 70 from the shell 20. In a preferred embodiment, the padding is adhered to the inner surface 110 of the shell 20. In another preferred embodiment, the padding 70 is held against the shell 20 by tape encircling the padding 70 and shell 20. In another preferred embodiment, both adhesives and tape are used to attach the padding to the inner surface 110 of the shell 20. A cover 72 may be placed on exposed portions of the padding 70 to prevent damage (e.g., cuts, tears and gouges) and excessive wear to the padding 70. The cover 72 may be any appropriate material such as cloth or vinyl.

The shell is made by the method discussed below. A mold of the shell is provided. Into the mold is layered the plurality of sheets of woven carbon fiber and the at least one sheet of resilient fiber material, preferably KEVLAR® fiber material, that comprise the outer layer 104. The mold is subjected to a defined temperature profile at a pre-selected pressure to bond the layers together. In a preferred embodiment, an autoclave is used to bond the layers. The bonded outer layer 104 is removed from the mold. A selected plurality of attachment plates are positioned and adhered to an inner surface of the outer layer 104. Holes in the outer layer 104 corresponding to those in the attachment plates are formed by passing a drill or punch through the holes in the attachment plates and the outer layer 104. The holes in the outer layer 104 are preferably covered by a non-reactive material to prevent the holes from being filled with material during the remainder of the making of the shell. The outer layer 104 is then returned to the mold. The material for the core 106 is cut and placed on the inner surface of the outer layer. Preferably, a coat of epoxy resin is placed on the inner surface of the outer layer 104 before the core is embedded, thus adhering the core to the outer layer 104. The plurality of sheets of woven carbon fibers and the at least one sheet of KEVLAR® fiber material forming the inner layer 102 are then are then placed on the core 106. A vacuum is established on the mold to force the components of the shell 20 against the mold. Preferably, the mold is enclosed in a bag and the vacuum is established within the bag. The bag enclosing the mold subjected to a predetermined temperature profile and pressure, preferably by inserting the bag in an autoclave. The autoclave is maintained at a pressure greater than atmospheric, preferably about 30 psig. Preferably, the temperature profile comprises maintaining the autoclave at about 100° F. for approximately 30 minutes, then increasing the temperature to a range of about 190° F. to 240° F., more preferably between about 200° F. and 225° F., and maintaining the increased temperature for approximately 60 minutes, followed by decreasing the temperature to ambient and allowing the mold to cool to ambient within the autoclave. The bag enclosing the mold is then removed from the autoclave, the mold is removed from the bag, and the resultant shell 20 is released from the mold. If needed, the shell 20 may be polished to remove excess material and to smooth the seating and non-seating surfaces 110, 112. The holes in the outer layer 104 are uncovered. In desired, the holes in the outer layer 104 may be extended through the inner layer (as illustrated in FIG. 2 as back plate 40). Support plates are positioned at selected locations to the non-seating surface 112 of the shell 20. The support plates are attached to corresponding attachment plates. In a preferred embodiment, the support plates are also attached to the shell 20 by an adhesive. In a preferred embodiment, sleeves of structural material are inserted into the holes in the outer layer 104 and the inner layer 102 to prevent undesired wear within the holes. These sleeves may be a part of the support plates or may be inserted individually. Preferably, the sleeves are held in place by adhesives.

An advantage of forming the shell 20 as a molded unitary piece is the elimination of any discontinuous transition between the back portion 30 and the bottom portion 22 of the shell 20, and the subsequent structural weakness resulting from the transition. Another advantage of using a molded shell instead of a shell of welded aluminum is the elimination of any structural weakness caused by deficient welds or heat related damage to the aluminum. Furthermore, a single mold of the shell 20 of the present invention may be used multiple times, thus providing a consistency not available to separately welded shells of the current art. Also, different molds may be used to provide shells with different contours or different sizes of the same contour. In each case, however, the shells provided by the above method are uniform for a particular mold.

Once the shell 20 is completed, the safety restraint system is attached to the seating surface 110 of the shell 20. Mounting stirrups 54, if used, are fastened to a corresponding attachment plate (as illustrated in FIG. 2, the mounting stirrups 54 for the shoulder straps 52 are fastened to the back plate 40) and the straps are movably attached to the mounting stirrups. If mounting stirrups are not used, fasteners are inserted through the straps and into corresponding attachment plates (as shown in FIG. 2, fasteners 60 are inserted through the seat end 59 of each of the lap belts 58 and into side plates 44). The attachment location of each of the straps may be adjusted by selecting different holes within the attachment plates and fastening the straps or mounting stirrups thereto.

The padding 70 may be disposed on the seating surface 110 of the shell 20 either before or after the safety restraint system is installed. In either case, openings are formed in the padding 70 to allow the straps to extend from the attachment locations through the padding 70 so that the straps may be secured around a driver occupying the safety seat 10. The padding is attached to the shell 20 and the straps are routed through the openings in the padding 70, thus completing assembly of the safety seat 10.

Custom-fit padding may be created by the following method. Malleable resin is enclosed in a bag which is then sealed to prevent spillage. The driver sits on the bag, thus forcing the resin therein to conform to the driver. Once the desired contour is achieved, a vacuum is established in the bag so that the driver may be removed. The resin cures under vacuum, thus retaining the desired contour. The cured contoured resin is removed from the bag and excess resin is removed. The contoured resin padding 70 is then installed on the seating surface of the shell 20. In another embodiment, the bag of resin in placed in the shell 20 before the driver sits on the bag. This allows the resin to conform to the shell contour as well as the driver.

Custom-fit padding may also be created by shaping foam blocks to conform to the desired contour. In addition, a generic contour for the padding may be followed to allow multiple users of a single safety seat 10 without the need to replace the padding 70 between users.

If desired, secondary support members, such as rib guards or leg rests, may be attached to the safety seat 10.

After assembly of the safety seat 10, as discussed above, the driver may return for final adjustments of the safety restraint system and the padding 70. If desired, the headrest 80 is attached to the back support plate 90 and adjusted. The mounting brackets 76 and 92 are attached to the side and back mounting plates 74, 90. The safety seat 10 is then positioned within the vehicle 5 and the mounting brackets 76, 92 are fixedly attached to selected structural members within the vehicle, such as a portion of the roll cage 7 and floor frames 9. Any additional adjustments of the safety restraint system, especially to accommodate the position of the driver and safety seat 10 within the vehicle, may be easily accomplished after the safety seat 10 has been installed in the vehicle.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for making a safety seat having a molded shell and a safety restraint system integral thereto, the steps comprising:

providing a molded shell having a plurality of attachment plates disposed therein, the shell having a seating surface and a non-seating surface opposite the seating surface, the plurality of attachment plates being disposed intermediate the seating surface and the non-seating surface;

securing the safety restraint system to the shell, the safety restraint system comprising a plurality of restraint straps, each of the plurality of restraint straps having a first end and a second end, the first end of each of the plurality of restraint straps being attached to a corresponding plate of the plurality of attachment plates, the second end of each of the plurality of restraint straps having a connecting device attached thereto for releasably securing together the plurality of restraint straps;

installing padding material on the seating surface of the shell; and extending a portion of the safety restraint system through the padding such that the padding material is intermediate the first end and the second end of each of the of the plurality of restraint straps.

2. A method of making a safety seat according to claim 1, wherein the step of securing the safety restraint system to the shell includes the step of fastening the first end of each of the plurality of restraint straps to a corresponding attachment plate by extending fasteners through each first end and into receptacles within the corresponding plate.

3. A method of making a safety seat according to claim 1, wherein the step of installing padding material comprises the steps of:

enclosing a malleable resin into a bag and sealing the bag to prevent spillage;

contouring the resin by seating a defined occupant on the bag of resin, whereby one surface of the resin conforms to a shape presented by the defined occupant;

establishing a vacuum within the bag;

disengaging the defined occupant from the bag;

curing the resin with the bag such that the resin maintains the contoured surface;

removing the resin from the bag;

removing excess resin from surfaces opposite the contoured surface;

installing the resin upon the seating surface of the shell, the contoured surface left exposed; and creating openings within the resin such that a portion of the safety restraint system is extendible therethrough.

4. A method of making a safety seat according to claim 3, further comprising positioning the bag of resin upon the seating surface of the shell prior to the seating step and removing the bag of resin from the shell prior to removing the resin from the bag.

5. A method of making a safety seat according to claim 3, further comprising the step of adjusting the contoured surface of the resin following the installation step.

6. A method of making a safety seat according to claim 1, wherein the step of installing padding material comprises the steps of:

cutting contoured shapes within foam, the shapes conforming to the seating surface of the shell; and installing the contoured shapes on corresponding portions of the seating surface of the shell.

7. A method of making a safety seat according to claim 6, wherein the step of installing the contoured shapes comprises:

maintaining the shapes on the corresponding portions of the seating surface of the shell; and taping the shapes to the shell.

8. A method of making a safety seat according to claim 1, wherein the step of installing the padding upon the seating surface comprises adhering the padding to the seating surface of the shell.

9. A method of making a safety seat according to claim 1, further comprising the step of covering the padding after the installation step.

10. A method a making a safety seat according to claim 1, further comprising the steps of:

providing a molded headrest having padding disposed thereon;

positioning the headrest at a top of the shell;

fastening a connector plate to a back of the headrest, the connector plate extending beyond the headrest toward the shell;
adjusting the headrest relative to a defined occupant; and
fastening the connector plate to an attachment plate disposed on a back portion of the shell.

11. A method of making a safety seat according to claim 10, further comprising the steps of:
   extending at least one linking member between the headrest and the shell; and
   attaching the at least one linking member to the headrest and the shell.

12. A method of making a safety seat according to claim 1, further comprising the steps of:
   positioning support plates on the non-seating surface of the shell opposite a portion of the plurality of attachment plates; and
   fastening said support plates to each corresponding attachment plate.

13. A method of making a safety seat according to claim 12, including the step of fastening a plurality of brackets to at least one of the support plates.

* * * * *